United States Patent [19]

Hoffman et al.

[11] Patent Number: 5,021,368

[45] Date of Patent: Jun. 4, 1991

[54] NOVEL CERAMIC-METAL COMPOUNDS

[75] Inventors: Ronald J. Hoffman, Midland; Cindy S. Hart, Freeland, both of Mich.

[73] Assignee: The Dow Chemical Company, Midland, Mich.

[21] Appl. No.: 250,578

[22] Filed: Sep. 29, 1988

[51] Int. Cl.$^5$ .................. C04B 35/52; C04B 35/56; C04B 35/58; F27B 09/04
[52] U.S. Cl. ................................ 501/92; 501/87; 501/94; 501/97; 264/65
[58] Field of Search ............. 429/191, 194; 264/65; 501/87-93; 75/203; 423/71

[56] References Cited

U.S. PATENT DOCUMENTS

| | | | |
|---|---|---|---|
| 3,956,194 | 5/1976 | Armand | 252/507 |
| 4,060,674 | 11/1977 | Klemann et al. | 429/194 |
| 4,104,451 | 8/1978 | Klemann et al. | 429/194 |
| 4,131,459 | 12/1978 | Phillips et al. | 75/203 |
| 4,308,171 | 12/1981 | Dines et al. | 252/430 |
| 4,323,480 | 4/1982 | Dines et al. | 252/439 |
| 4,365,215 | 12/1982 | Coetzer et al. | 429/199 |
| 4,490,319 | 12/1984 | Lee et al. | 264/65 |
| 4,743,511 | 5/1988 | Sowman et al. | 428/547 |

FOREIGN PATENT DOCUMENTS 62-212205  3/1986  Japan .................................. 21/64

OTHER PUBLICATIONS

Tumanov, A. A., "Spectrophotometric Determination of Indium in Indium-Gallium-Arsenic Solid Solutions".

Sinitsyn, M. A., "Inclusion of Aluminum in the Solid Solutions Aluminum Gallium Arsenide Obtained from the Gas Phase".

Interrante, Leonard V., "An Investigation into the Preparation Properties and Processing of SiC and $Si_3N_4$/Alum. Nitride Solid Solutions from Organometallic Precursors".

*Primary Examiner*—William R. Dixon, Jr.
*Assistant Examiner*—Alan Wright

[57] ABSTRACT

Novel ceramic-metal intercalation compounds useful in the formation of densified ceramic-metal articles are prepared, for instance, by exposing a ceramic to an organometallic compound in a low dielectric solvent. The use of the ceramic-metal compounds in the formation of articles by densification allows achievement of densified compositions having at least one of increased density, hardness, and toughness.

26 Claims, No Drawings

NOVEL CERAMIC-METAL COMPOUNDS

BACKGROUND OF THE INVENTION

1. Field of the invention

This invention relates to ceramic-metal compounds also termed inclusion compounds, intercalation compounds, or solid solutions.

2. Description of the Prior Art

References showing intercalation of a chalcogenide cathode, such as $TiS_2$, with an alkali metal ion are Klemann et al, U.S. Pat. No. 4,104,451 and U.S. Pat. No. 4,060,674. The reaction is conducted in the presence of an organometallic alkali metal salt dissolved in an organic solvent as an electrolyte in an electrolytic cell. The nonaqueous electrolyte salts are alkali metal salts of boron or aluminum containing organic groups. In addition, Coetzer et al in U.S. Pat. No. 4,366,215 disclose electrochemical cells having nonaqueous electrolytes and cathodes derived from, for instance, $Co_3O_4$ which are capable of intercalation of an ionized form of an anode metal such as an alkali or alkaline earth metal.

As disclosed in U.S. Pat. No. 4,323,480 and U.S. Pat. No. 4,308,171 to Dines et al, high surface area, finely divided particle size, and small crystallite diameter is obtained in chalcogenides of the formula $MX_y$ wherein M is a metal selected from group IVb, Vb and molybdenum and tungsten transition metals of the Periodic Table of the Elements, X is a chalcogenide selected from the group consisting of sulfur, selenium, and tellurium and y is a number of two to about four. These chalcogenides, which are suitable for forming intercalation compounds, are prepared by the low temperature non-aqueous precipitation of the $MX_y$ compounds from solutions comprising mixtures of the salts of the above metals with solutions of or slurries of sources of sulfide, selenium, or telluride ions.

In U.S. Pat. No. 4,490,319 to Lee et al, methods are disclosed for producing high strength, fine grain, sintered ceramic articles from ceramic particles by a method of hot pressing involving the use of a rapid heating rate. There is no indication that the ceramic particles contain an intercalated metal.

SUMMARY OF THE INVENTION

There is disclosed a ceramic-metal compound having the formula $M_x[A]$ wherein A is a ceramic and M is a metal capable of incorporation into the crystal structure of the ceramic. Such ceramic-metal compounds are useful in the formation of ceramic-metal articles which are formed by densification of a ceramic powder such as by sintering, hot pressing, or hot isostatic pressing. The ceramic-metal compounds are formed preferably by reacting a ceramic material in finely powdered form with a low dielectric solvent solution of an organometallic compound, or a metal ion present in the gaseous phase. Alternatively, the ceramic-metal compounds of the invention can be prepared by forming the ceramic powder into such a shape as to permit its use as a electrode in an electrochemical cell and utilizing the electrode as the cathode of the cell. An aqueous or nonaqueous electrolyte can be utilized in the cell. Preferably, a nonaqueous electrolyte containing an organometallic salt is used wherein the metal of the salt is the same as the metal of the anode.

DETAILED DESCRIPTION OF THE INVENTION AND THE PREFERRED EMBODIMENTS

It has been found, as disclosed in the U.S. application Ser. No. 002,541, of Ronald J. Hoffman, filed Jan. 12, 1987, that an electric current producing primary electrochemical cell can be made in which an aqueous electrolyte is utilized in combination with a ceramic cathode capable of intercalating anode ions. An aqueous electrolyte containing an ionizable salt is utilized in which the ionizable salt is of an alkali metal or an alkaline earth metal. The anode active material can be magnesium or calcium or an alloy thereof. An example in this application discloses an electrolyte which is an aqueous solution of a magnesium salt in an electrochemical cell having magnesium as the anode material and $Co_3O_4$ as the ceramic cathode material.

In addition, in the U.S. application Ser. No. 936,531, of Hoffman et al, filed Dec. 1, 1986, there is disclosed a secondary electrochemical cell in which a nonaqueous, electrolyte is utilized in combination with an alkaline earth metal anode and a ceramic cathode capable of intercalation of anode ions. An example in this application discloses the use of a magnesium anode in combination with a magnesium dibutyldiphenylborate electrolyte salt in an organic solvent in combination with a ceramic cathode material of $Co_3O_4$. Magnesium ions are intercalated during discharge of the cell.

The following definitions and background information are applicable to an understanding of this invention and/or the prior art:

Sintering is the development of strength and associated densification of a powder compact through the application of heat alone.

Hot pressing is the combined application of heat and pressure applied through the action of a mechanical piston on a powder-filled cavity of a die. Under such conditions the pressure on the powder is non-uniformly applied due to die wall friction and the axial application of the piston force. Under proper conditions of temperature and pressure, densification of the compact can result.

Hot isostatic pressing is the simultaneous application of isostatic pressure and heat to an article whose porosity is to be reduced. Usually a preformed ceramic article is utilized which must first be evacuated and then sealed in a gas-impermeable envelope. The preformed article can be formed from a powder encapsulated in tantalum or other refractory metal, depending upon the temperature required for densification. A glass encapsulation coating can also be used. Subsequent to encapsulation, the preform is placed in an autoclave which is then evacuated and the temperature is raised until the glass or tantalum coating softens and forms a continuous layer on the surface of the article. The pressure and temperature are then increased to the levels required to accomplish densification of the ceramic preform.

Cermets are mixtures of ceramics and metals. These can be sintered or hot pressed and combine the ductility and thermal shock resistance of metals with the refractory qualities of ceramics. The metal serves as a binder for the high-refractory ceramic particles, increasing the thermal conductivity and shock resistance of the ceramic. This latter property imparts a high temperature strength to the cermet that is nearly equal to that of the pure ceramic. All refractory carbides, borides, oxides, as well as certain silicides and sulfides, can be used as ceramic ingredients for cermet manufacture. As metals, iron, chromium, nickel, cobalt, aluminum, and molybdenum, as well as alloys of several metals with these metals can be used. Cermets are usually fabricated by powder metallurgy techniques. The properties of the cermet depend upon the ratio of ceramic to metal as well as the particle size of the powder, the surface tension, and the wetting characteristics of the metal utilized. Some cermets are made by impregnating a porous mixture with a metallic binder. Most cermets contain about 80% of a ceramic material and about 20% of a metal. Cermets are used in various applications in which high-temperature and improved shock resistance are required, as in rocket and jet engine parts, spinning tools for hot metals, hot-forging dies, and similar applications. Typical cermets are illustrated by the following combinations of ceramic and metal: zirconium carbide and iron; titanium carbide and cobalt; molybdenum carbide and cobalt; tungsten carbide and cobalt; chromium carbide and nickel; molybdenum boride and nickel or nickel-chromium; magnesium oxide and nickel; and aluminum oxide and chromium.

The cermet compositions of most significance for practical or potential applications are based upon carbides. These exhibit properties of high-temperature strength and great hardness such as the titanium carbide/nickel cermets. The oxide-base cermets also have valuable high strength properties at high temperatures and are reasonably stable in air. The most extensively investigated and the only commercially available oxide-base cermets are mixtures primarily composed of aluminum oxide and chromium suitably alloyed to give useful high temperature properties. During sintering, the metal phase is usually in the liquid state and completely wets and flows between the particles of the ceramic, forming a thin film of metal.

Studies have shown that in prior art cermets, for densification to take place rapidly it is essential to have an appreciable amount of the liquid phase metal present. In addition, it is necessary to select a metal exhibiting an appreciable solubility in the ceramic material and which is capable of wetting the ceramic easily. Thus the driving force for densification during sintering of the ceramic is derived from the capillary pressure of the liquid phase metal which is located between the particles of the ceramic. Densification by way of capillary pressure results in several different processes which occur simultaneously. On formation of a liquid metal phase, there is a rearrangement of the particles of the ceramic to give a more effective packing. This process can lead to complete densification if the volume of liquid present is sufficient to fill in the interstices completely. In addition, at contact points where there are bridges between particles, high local stresses lead to plastic deformation and creep, which allow a further rearrangement. During the sintering process a solution of smaller particles and growth of larger particles by material transfer through the liquid phase occurs. Because there is a constantly imposed capillary pressure, additional particle rearrangement can occur during grain-growth and grain-shape changes to give further densification. In situations in which the liquid metal penetrates between particles, the increased pressure at the contact points leads to an increased solubility such that there is material transfer away from the contact areas so that the particle centers approach one another and shrinkage, i.e., densification results.

In the hot pressing method of densification, sintering occurs as the result of externally applied pressure at elevated temperature rather than relying entirely upon capillary pressure. The hot pressing densification process is desirable in that it eliminates the need for a very fine particle material and also removes large pores caused by nonuniform mixing. An additional advantage is that in some cases densification can be obtained at a temperature at which extensive grain growth or secondary recrystallization does not occur. Since the mechanical properties of many ceramic systems are maximized with high density and small grain size, optimum properties can be obtained by hot pressing techniques.

Solid solutions are defined for the purposes of the description of this invention as ceramic host materials in which the crystalline structural characteristics are altered from those of an ideal crystal by the inclusion of foreign atoms in the crystal of the host ceramic. The intercalation compounds referred to in the specification and claims of this application are intended to refer to a new ceramic compound having a crystalline form in which a foreign metal atom is incorporated into the crystal structure of the ceramic material.

One of the main reasons that ceramics are not used more widely in many applications is the fact that they fail when subjected to sufficient stress with "glass like" brittle fracture. In addition, they do not normally exhibit appreciable plastic deformation and their impact resistance is low. Therefore, the use of a ceramic for many structural uses is limited by these relatively poor (in comparison with metals) mechanical properties. It is an object of the present invention to increase at least one or both of the strength, or toughness, of ceramic materials and the hardness of these materials by incorporation of metal ions into the crystal lattice structures of the ceramic. It is a further object of the invention to achieve densified ceramic-metal compositions having increased density.

The use of the compounds of this invention to form densified articles overcomes a particularly troublesome problem encountered in the formation of prior art cermets into densified articles. Ceramic-metal (cermet) compositions of the prior art are generally made by the crude mixing of a metal with a ceramic powder. Usually this method produces a very nonuniform dispersion of the metal particles. By the introduction of chemical surfactants into the prior art ceramic-metal composition, greater uniformity of dispersion can be obtained. Specific surfactants are required for a particular ceramic and metal powder. The degree of uniformity for a dispersion is limited by the particle size of the powders utilized. Another prior art method of mixing a ceramic with a metal powder is by the co-precipitation of the metal, such as a metal oxide with a ceramic material, usually a soluble metal oxide. This technique results in a uniformly dispersed metal compound having a particle size on the order of 100-500 angstroms. The use of this technique is limited to soluble oxide ceramics and metal compounds. It is noted that the use of techniques such as chemical vapor deposition and ion implantation techniques is not applicable to the preparation of the ceramic-metal compounds of this invention but pertains to the treatment of thin films having a thickness of usually less than 10,000 angstroms.

The compounds of the invention are distinguished from each of these prior art cermets, made in accordance with the above techniques, in that instead of utilizing a physical mixture of a metal powder and a ceramic powder, a chemical compound is formed of the metal and the ceramic material. The metal is incorporated into the crystalline structure of the ceramic material and is thus dispersed at an atomic level. Prior art problems associated with uniformity of dispersion either do not exist or are at least greatly minimized.

The densified ceramic-metal articles of the invention are made utilizing a ceramic-metal intercalation compound having the formula $$M_x[A]$$

wherein A is a ceramic selected from the group consisting of at least one of nitrides, silicides, carbides, borides, phosphides, arsenides, and metal alloys thereof and M is a metal, the ionized form of which is capable of incorporation (intercalation) within the crystal structure of the ceramic, said metal is selected from the metals of Groups 1a, 1b, 2a, 2b, 3a, 3b, 4a, 4b, 5a, 5b, 6a, 6b, 7a, 7b, and 8 of the Periodic Table of the Elements, and x has a value in the range of about 0.002 to about 0.5, preferably about 0.05 to 0.3, and most preferably about 0.1 to about 0.15, said ceramic-metal compound characterized as an intercalation compound, an inclusion compound, or a solid solution. The Periodic Table of the Elements referred to above is that which is published in the 52nd edition of The Handbook of Chemistry and Physics, Chemical Rubber Company (1971-1972).

The metal ion intercalated ceramic compounds of the invention can be prepared, in one embodiment of the process of the invention, by reacting a ceramic material in finely divided powder form with an organometallic compound dissolved in a low dielectric solvent. Generally, the organometallic compound is present in solution at a concentration by weight (based upon the total weight of solution) of about 0.5 percent to about 20 percent, preferably about 1 percent to about 15 percent and most preferably about 2 percent to about 10 percent. The concentration of organometallic compound is not believed critical to effecting the intercalation reaction. The ranges of concentration are given merely to illustrate the desired ranges to obtain a reasonable speed of reaction. The proportion of ceramic powder is also not critical to effecting the intercalation reaction but generally about 0.5 percent to about 80 percent by weight, preferably about 1 percent to about 15 percent, and most preferably about 2 percent to about 10 percent is used in order to obtain a reasonable reaction speed. Said reaction can take place at ambient temperature or below up to about the boiling point at ambient pressure of the low dielectric solvent used. After reaction, the desired ceramic-metal compound is isolated from the solvent.

Representative classes of low dielectric organic solvents are nonaqueous solvents such as the aldehydes, preferably $C_1$ to $C_8$, the ethers, preferably $C_4$ to $C_8$, the aromatics, preferably $C_6$ to $C_{20}$, the aliphatics, preferably $C_4$ to $C_{12}$, and the alkyl halides, preferably $C_1$ to $C_{20}$. Representative examples of useful low dielectric solvents are as follows: ethers such as tetrahydrofuran, 1,3 dioxane, 1,2-dimethoxyethane, dimethyl ether, 1,4 dioxane, 2-methyltetrahydrofuran, diglycol methyl ether, triethylene glycol dimethyl ether, di-n-butyl ether, diphenyl ether, crown ethers, and phenyl ethyl ether; aliphatics such as cyclopentane, cyclohexane, methylcyclohexane, and tetrahydronapthalene; aromatics such as toluene and benzene; alkyl halides such as trichloromethane; and aldehydes such as formaldehyde, acetaldehyde, propionaldehyde, and butyraldehyde.

Alternatively, the ceramic-metal compounds can be made by reacting the finely powdered ceramic with a metal ion present in the gas phase or an electrochemical approach can be utilized to prepare the ceramic-metal compound by forming the ceramic material into a shaped article which is then inserted into an electrochemical cell and utilized as the cathode of the cell. In this method, the metal ion to be inserted within the crystal structure of the ceramic material cathode can be derived from the metal of the anode of the cell which is present in ionized form in the electrolyte of the cell. Either nonaqueous, i.e. organic solvent containing, or aqueous electrolytes can be used containing, respectively, an organometallic salt or an inorganic salt such as an alkali metal or alkaline earth metal salt.

Useful ceramics (A) are exemplified by, but are not intended to be limited by, the following listing of types of ceramic materials: borides, nitrides, carbides, silicides, phosphides, arsenides, and metal alloys thereof.

Useful metals for insertion into the ceramic materials are exemplified by, but are not intended to be limited by, the following listing: magnesium, chromium, cobalt, nickel, copper, aluminum, ruthenium, mercury, antimony, and lead.

Representative carbides are selected from the group consisting of $B_4C$, $TiC$, $SiC$, and mixtures thereof. Representative borides are selected from the group consisting of $TiB_2$, $ZrB_2$, $NbB_2$, and mixtures thereof. Representative nitrides are selected from the group consisting of $BN$, $AlN$, $Si_3N_4$, and mixtures thereof.

In the formation of densified ceramic-metal articles by the process of the invention, a composite comprising the powdered ceramic-metal compound of the invention is consolidated by sintering or by sintering under pressure either by hot pressing or by hot isostatic pressing to produce a shaped article. In this process, the ceramic-metal compacted material is heated and held at a desired temperature for at least the length of time needed to achieve densification. The sintered body is then permitted to cool. The ceramic-metal material may contain impurities which will react chemically at elevated temperature to inhibit densification or to degrade the system which results in an undesirable sintered product. In such cases, a sufficiently rapid rate of heating can be applied such that the rate of densification during sintering is faster than the rate at which the unwanted chemical reaction occurs. The heating rate can exceed a rate of about 100° C. per minute in accordance with the rapid rate sintering of ceramics described in U.S. Pat. No. 4,490,319. Current commercial practice couples very slow heating rates with long periods of holding at the densification temperature.

Ceramic articles, modified by the process of the invention to include a foreign metal atom incorporated into the crystal structure of the ceramic material and densified by the practice of this invention, have higher density than densified articles prepared with the unmodified ceramic material. Generally, the densification process is conducted in a resistance heated furnace such as one having a molybdenum or graphite element, and a high purity inert argon atmosphere is utilized during the procedure. Maximum inert atmosphere temperatures employed are typically less than 1900° C.

This invention is the outgrowth of studies of the effect upon densification of boron carbide and other ceramics into which various metals are intercalated prior to densification of the powder. The ceramic-metal intercalation compound is prepared in one embodiment of the invention by exposing the boron carbide in finely divided form to an organometallic compound dissolved in a low dielectric solvent. By the use of such ceramic-metal compounds in the formation of densified boron carbide articles, it has been found that the theoretical density of 2.52 grams per cubic centimeter is obtained even when the metal compounds are hot pressed at a substantially reduced hot pressing temperature, as compared to prior art densification processes. In addition, the ceramic-metal compounds of the invention when formed into ceramic articles by hot pressing exhibit at least one of increased density, hardness, and toughness, as compared to articles made utilizing the unmodified boron carbide.

The following examples illustrate the various aspects of the invention but are not intended to limit its scope. Where not otherwise specified throughout this specification and claims, temperatures are given in degrees centigrade and parts, percentages, and proportions are by weight. The examples will show the preparation of ceramic-metal compound intercalates which are useful in the formation of ceramic-metal articles by hot pressing.

EXAMPLE 1

Utilizing a boron carbide ($B_4C$) powder having an average particle size of about 2 micrometers, a mixture was made of 8.6 grams of boron carbide in a solution of dicyclopentadienyl chromium in toluene having a concentration of 9.6 percent by weight. The mixture was stirred for 139 hours at ambient temperature and pressure inside a dry box. After this time, 8.86 grams of powder were recovered upon removal of the solvent solution and rinsed with toluene prior to drying the powder. A sample weighing 0.23 grams was removed and digested in nitric acid in order to determine the chromium content of the mixture. Atomic absorption analysis indicated that the boron carbide powder contains 2.65 percent by weight of chromium. This percentage of chromium equates to a mole percent of 2.93 for the novel intercalation compound $Cr_xB_4C$, where x (the mole fraction of chromium) equals 0.15. The intercalated ceramic compound can be expressed as $Cr_{0.15}B_4C$.

Similarly, boron carbide powder was reacted with other organometallic compounds in low dielectric solvents as follows:

EXAMPLE 2

Under the conditions of Example 1 about 50 cubic centimeters of 2 molar trimethyl aluminum solution in the low dielectric solvent toluene was reacted with 7.18 grams of boron carbide to produce a ceramic-metal compound having 1.08 percent by weight aluminum ion. This corresponds to a mole percent of aluminum of 2.29 and a mole fraction of aluminum (x) of 0.117. The novel intercalation compound $Al_{0.117}B_4C$ was produced.

EXAMPLE 3

Dicyclopentadienyl cobalt in the amount of 9.92 grams was added to 80 milliliters of the low dielectric solvent toluene and the mixture was reacted under the conditions of Example 1 with 6.77 grams of boron carbide powder to produce a ceramic-metal compound having 0.54 percent by weight of cobalt, corresponding to a mole percent of cobalt of 0.52 and a mole fraction for cobalt (x) of 0.026. The novel intercalation compound $Co_{0.026}B_4C$ was produced.

EXAMPLE 4

Dicyclopentadienyl ruthenium in the amount of 2.0 grams was dissolved in the low dielectric solvent chloroform and reacted under the conditions of Example 1 with 5.17 grams of boron carbide powder to produce a ceramic-metal compound having 0.5 percent by weight of ruthenium, corresponding to a mole percent of 0.28 ruthenium and a mole fraction of ruthenium (x) of 0.014 to produce the novel ceramic-metal intercalation compound $Ru_{0.014}B_4C$.

EXAMPLE 5 (control, forming no part of this invention)

The boron carbide ($B_4C$) powder used in the preparation of the novel intercalated ceramic-metal compounds is used as a control in the hot pressing experiments which follow.

Utilizing the boron carbide-metal intercalates prepared in Examples 1–4, the powdered boron carbide compounds were hot pressed utilizing a resistance-heated furnace. With this equipment, temperatures of about 2000 degrees centigrade could be maintained accurately within a few degrees of the desired value. For comparison, the same boron carbide powder utilized in the preparation of the boron-carbide metal intercalates was used in the formation of hot pressed ceramic articles. In the preparation of the ceramic-metal articles, the hot pressing was carried out at a temperature of 1950 degrees centigrade over a hot pressing cycle time of about 2 hours. The average rate of heating was about 27° C. per minute. The results indicate that the theoretical density of 2.52 grams per cubic centimeter is obtained utilizing the ceramic-metal compounds of Examples 1–4. In the case of Example 4, the ruthenium boron carbide compound density determination is within experimental error of the theoretical density. In addition, increased hardness and moderate to substantial increases in fracture toughness are obtained utilizing the novel ceramic-metal intercalates as compared to the untreated boron carbide control. The results are summarized in the following table.

| | Densified ceramic-metal articles of invention vs boron carbide control | | |
|---|---|---|---|
| Example | Density (g/cc) (Theoretical = 2.52) | Vickers Hardness 1 KG (Kg/mm$^2$) | Fracture Toughness (MP m $\frac{1}{2}$) indentation (1 Kg load) |
| 1 ($Cr_xB_4C$) | 2.56 | 3882 | 3.4 |
| 2 ($Al_xB_4C$) | 2.53 | 3403 | 3.8 |
| 3 ($Co_xB_4C$) | 2.52 | 3355 | 3.0 |
| 4 ($Ru_xB_4C$) | 2.51 | 3403 | 3.5 |
| 5 ($B_4C$ | 2.44 | 3000–3100 | about 3.0 |

-continued

| | Densified ceramic-metal articles of invention vs boron carbide control | | |
|---|---|---|---|
| Example | Density (g/cc) (Theoretical = 2.52) | Vickers Hardness 1 KG (Kg/mm$^2$) | Fracture Toughness (MP m ½) indentation (1 Kg load) |
| control) | | | |

EXAMPLES 6 TO 13

Silicon carbide and titanium carbide powders are each similarly reacted under the conditions of Example 1 in the same proportions with the same proportion of the organometallic compounds of Examples 1-4 to produce intercalated ceramic compounds useful in the preparation of shaped articles densified by hot pressing.

EXAMPLES 14 TO 25

Titanium boride, zirconium boride and niobium boride powders are each similarly reacted under the conditions of Example 1 in the same proportions with the same proportions of the organometallic compounds of Examples 1-4 to produce intercalated ceramic compounds useful in the preparation of shaped articles densified by hot pressing.

EXAMPLES 25 TO 36

Boron nitride, aluminum nitride, and silicon nitride powders are each similarly reacted under the conditions of Example 1 in the same proportions with the same proportions of the organometallic compounds of Examples 1-4 to produce intercalated ceramic compounds useful in the preparation of shaped articles densified by hot pressing.

EXAMPLE 37

A solution of about 9 percent dicyclopentadienyl nickel was prepared in the low dielectric solvent toluene. This solution was reacted under the conditions of Example 1 with 10.28 grams of titanium diboride (also generally referred to as "titanium boride") to produce a ceramic-metal compound having 0.118% nickel. The mole fraction of nickel (x) was 0.004. The novel intercalation compound $Ni_{0.004}TiB_2$ was produced.

EXAMPLE 38

A solution of dicyclopentadienyl cobalt was prepared containing 9.92 grams of this organometallic compound and 80 milliliters of the low dielectric solvent toluene. This solution was reacted with 9.79 grams of titanium boride powder to produce a ceramic-metal compound having 0.15% cobalt. The mole fraction of cobalt (x) was 0.005. The novel intercalation compound $Co_{0.005}TiB_2$ was produced.

EXAMPLE 39

A solution of dicyclopentadienyl iron was prepared by adding 10.19 grams of this organometallic compound to 50 cubic centimeters of chloroform. This solution was thereafter reacted under the conditions of Example 1 with 5.87 grams of titanium boride powder to produce a ceramic-metal compound having 0.285% iron. The mole fraction of iron (x) was 0.01. The novel intercalation compound $Fe_{0.01}TiB_2$ was produced.

EXAMPLE 40-42

Utilizing the titanium boride-metal intercalates prepared in Examples 37-39, the compounds in powder form were hot pressed into articles utilizing a resistance-heated furnace which was maintained at a temperature of 1250° C. At this temperature, a cycle time of 3.5 hours at a heating rate of about 21° C. per minute was used.

EXAMPLE 43-45

Utilizing the titanium boride-metal intercalates prepared in Examples 37-39, the compounds in powder form were hot pressed into articles utilizing a resistance-heated furnace maintained at a temperature of 1550° C. and utilizing a cycle time of 2.5 hours with an average heating rate of about 22° C. per minute. The determinations of the samples prepared in Examples 37-39 are summarized in the following Table.

| | Densified ceramic-metal articles of the invention at 1250° C. and 1550° C. (Theoretical density 4.5 g/cc) | | | |
|---|---|---|---|---|
| Compound Example | Density (grams per cc) press temperature of 1250° | % of Theoretical density | Density (grams per cc) press temperature of 1550° | % of Theoretical density |
| 37 | 4.37 | 97.1 | 4.1 | 91.1 |
| 38 | 4.4 | 97.8 | 4.37 | 97.1 |
| 39 | 4.0 | 88.9 | 4.38 | 97.3 |

The density of densified articles prepared from titanium boride (no intercalated metal) when pressed at a temperature of 1250° C., would typically be about 85% of the theoretical density at best.

EXAMPLES 46-51

Niobium boride and zirconium boride powders are similarly reacted under the conditions of Example 1 in the same proportions with the same proportions of the organometallic compounds of Examples 37-39 to produce intercalated ceramic compounds useful in the preparation of shaped articles densified by hot pressing.

EXAMPLE 52

Utilizing the boron carbide powder of Example 1, a mixture was made of 8 grams of boron carbide in a solution of butyl magnesium in heptane having a concentration of 0.5 molar. The solution was agitated periodically over a period of about 144 hours while under a nitrogen blanket. Thereafter an equal volume of n-heptane was added and the solution filtered. After removal of solvent, 8.5 grams of the reaction product was obtained.

EXAMPLE 53

Titanium boride was substituted for boron carbide and reacted under the conditions of Example 52 to produce a reaction product which was recovered after about 168 hours reaction time in the amount of 6.75 grams.

EXAMPLE 54

A mixture was made of 4.6 grams of a boron carbide powder having an average particle size of about 2 micrometers, 2.0 grams of bis(triphenylphosphine) copper (I) borohydride, and 170 milliliters of a solvent mixture containing 20 milliliters of tetrahydrofuran and 150 milliliters of benzene. The solution was stirred in a dry box at ambient temperature and pressure for a total of 166 hours. Thereafter, the solution was filtered and rinsed at least four times with an equal volume of tetrahydrofuran. Upon removal of the solvent, 96.95% of the original weight of the boron carbide powder was recovered after allowing the filter cake to dry for over 24 hours in a dry box. A sample weighing 0.226 grams was removed and digested in nitric acid. Atomic absorption analysis of this sample indicated that the boron carbide powder contains 3.3% by weight of copper. This percentage of copper equates to a mole percent of 2.94 for the novel intercalation compound $Cu_xB_4C$, where x (the mole fraction of copper) equals 0.152. The intercalated ceramic compound can be expressed as $Cu_{0.152}B_4C$.

EXAMPLE 55

Using 4.61 grams of a boron carbide powder having an average particle size of 2 micrometers, a mixture was made with 1.78 grams of tetraphenyl lead dissolved in 100 milliliters of solvent consisting of 65 milliliters of tetrahydrofuran and 35 milliliters of benzene. The mixture was stirred for 166 hours at ambient temperature and pressure after which the solution was filtered and rinsed with several equal volumes of tetrahydrofuran and permitted to dry in a glove box for greater than 24 hours. After this time, 4.47 grams (96.95% of the originally added boron carbide powder) was recovered. A sample weighing 0.30 grams was removed and digested in nitric acid. Atomic absorption analysis of this sample indicated that the boron carbide powder contains 0.10% by weight of lead. This percentage of lead equates to a mole percent of 0.027 for the novel intercalation compound $Pb_xB_4C$, where x (the mole fraction of lead) equals 0.0014. The intercalated ceramic compound can be expressed as $Pb_{0.0014}B_4C$.

EXAMPLE 56

Using 4.78 grams of a boron carbide powder having an average particle size of about 2 micrometers, a mixture was made with 5.11 grams of diphenyl mercury in 60 milliliters of tetrahydrofuran. The mixture was stirred for 168 hours at ambient temperature and pressure inside a dry box. After this time, the mixture was filtered and rinsed several times with equal volumes of tetrahydrofuran prior to drying the powder. A sample weighing 4.62 grams (97.4% of the weight of the original boron carbide powder) was recovered. A sample weighing 0.24 grams was removed and digested in nitric acid. Atomic absorption analysis of this sample indicated that the boron carbide powder contains 1.45% by weight percent of mercury. This percentage of mercury equates to a mole percent for the novel intercalation compound $Hg_xB_4C$, where x (the mole fraction of mercury) equals 0.02. The intercalated ceramic compound can be expressed as $Hg_{0.01}B_4C$.

EXAMPLE 57

Using 25 grams of an alpha silicon carbide powder sold under the trade designation Grade A-10 by Starck, a mixture was made of a solution of about 8% by weight bis(cyclopentadienyl) nickel in toluene. The mixture was stirred for 191 hours at ambient temperature and pressure inside a dry box. After this time, the solution was filtered and rinsed several times using equal volumes of toluene. Upon drying in a glove box for greater than 48 hours, 19.51 grams of product were recovered. It is noted that some loss occured as the result of spillage resulting in a low product yield. A sample weighing 0.57 grams was removed and digested in nitric acid. Atomic absorption analysis of this sample indicated that the silicon carbide powder contains 1.9% by weight of nickel. This percentage of nickel equates to a mole percent of 1.33 for the novel intercalation compound $Ni_xSiC$, where x (the mole fraction of nickel) equals 0.026. The intercalated ceramic compound can be expressed as $Ni_{0.026}SiC$.

EXAMPLE 58

Using the same alpha silica carbide used in Example 57, a mixture was made of 25 grams of silicon carbide and 50 milliliters of a 50% by volume solution of bis (cyclopentadienyl) chromium in toluene. The mixture was stirred for 188 hours at ambient temperature and pressure inside a dry box. After this time the solution was filtered and rinsed several times in equal volumes of toluene and thereafter allowed to dry in a dry box for a time greater than 48 hours after which 24.44 grams of product (97.7% of the weight of the original silicon carbide) was recovered. A sample weighing 0.64 grams was removed and digested in nitric acid. Atomic absorption analysis of this sample indicated that the silicon carbide powder contains 0.43% by weight of chromium. This percentage of chromium equates to a mole percent of 0.34 for the novel intercalation compound $Cr_xSiC$, where x (the mole fraction of chromium) equals 0.006. The intercalated ceramic compound can be expressed as $Cr_{0.006}SiC$.

EXAMPLE 59

Using 25.54 grams of a beta silicon carbide powder sold by Ibiden, a mixture was made with a chloroform solution containing 4.43 grams of triphenyl antimony in 100 milliliters of chloroform. The mixture was stirred at ambient temperature and pressure inside a dry box. After this the solution was filtered and rinsed several times with equal volumes of chloroform and allowed to dry. After drying, a sample weighing 25.80 grams of product (101% of the original weight of the silicon carbide) was recovered. A sample weighing 5 grams was removed and x-ray fluorescence analysis indicated that the silicon carbide powder contains 2.24% by weight of antimony. This percentage of antimony equates to a mole percent of 0.76 for the novel intercalation compound $Sb_xSiC$, where x (the mole fraction of antimony) equals 0.015. The intercalated ceramic compound can be expressed as $Sb_{0.015}SiC$. Each of the compounds of Examples 54-59 are used to prepare shaped articles, densified by hot pressing.

Using the titanium boride compound intercalates prepared in Example 53, articles were prepared from the powdered compounds by densification at a temperature of 2000° C. by hot pressing the powdered compounds utilizing a resistance-heated furnace. For comparison the same titanium boride powder utilized in the preparation of the titanium-boride magnesium intercalates was used in the formation of hot pressed ceramic articles. The results indicate that the theoretical density for titanium boride of 4.52 grams per cubic centimeter was more closely approached utilizing the ceramic-metal intercalates. The density of the control titanium boride articles was 4.19 grams per cubic centimeter (92.7% of theoretical) and the density of the titanium boride-magnesium intercalates was 4.30 grams per cubic centimeter (95% of theoretical). In addition, micrographs of etched samples of the control versus the inventive hot pressed articles showed that the inventive article has a grain size structure and distribution that is more controlled than that which is attained utilizing the titanium boride powder to prepare the control sample. That is, exaggerated grain growth is normally seen in articles prepared from titanium boride when hot pressed at a temperature of 2000° C. while the grain growth of the inventive sample articles prepared utilizing the ceramic-magnesium compound intercalate was smaller and more controlled. For instance, the largest grains seen in the inventive sample article are on the order of 10 micrometers while in the control sample what is termed "exaggerated grain growth" is representative of grains having a size of about 100 micrometers.

While this invention has been described with reference to certain specific embodiments, it will be recognized by those skilled in the art that many variations are possible without departing from the scope and spirit of the invention and it will be understood that it is intended to cover all changes and modifications of the invention disclosed for the purpose of illustration which do not constitute departures from the spirit and scope of the invention.

The embodiments of the invention in which an exclusive property or privilege is claimed are defined as follows:

1. A ceramic-metal intercalation compound having the formula $M_x[A]$ wherein A is a ceramic selected from the group consisting of at least one of nitrides, silicides, carbides, borides, phosphides, and arsenides, and metal alloys thereof and M is a metal capable of incorporation into the crystal structure of the ceramic, said metal (M) is selected from at least one of the metals of Groups 1a, 1b, 2a, 2b, 3a, 3b, 4a, 4b, 5a, 5b, 6a, 6b, 7a, 7b, and 8 of The Periodic Table of the Elements, and x has a value of about 0.002 to about 0.5.

2. The compound of claim 1 wherein said metal (M) is a transition metal selected from at least one of the metals of Groups 1b, 2b, 3b, 4b, 5b, 6b, 7b, and 8 of The Periodic Table of the Elements.

3. The compound of claim 1 wherein said carbides are selected from the group consisting of $B_4C$, TiC, SiC, and mixtures thereof and said metal (M) is selected from at least one of the group consisting of magnesium, iron, chromium, cobalt, nickel, copper, lead, aluminum, ruthenium, mercury, and antimony.

4. The compound of claim 1 wherein said borides are selected from the group consisting of $TiB_2$, $ZrB_2$, $NbB_2$, and mixtures thereof and said metal (M) is selected from at least one of the group consisting of magnesium, iron, chromium, cobalt, nickel, copper, lead, aluminum, ruthenium, mercury, and antimony.

5. The compound of claim 1 wherein said nitrides are selected from the group consisting of BN, AlN, $Si_3N_4$, and mixtures thereof and said metal (M) is selected from at least one of the group consisting of magnesium, iron, chromium, cobalt, nickel, copper, lead, aluminum, ruthenium, mercury, and antimony.

6. The ceramic-metal compound of claim 1 wherein said ceramic is boron carbide and said metal (M) is selected from at least one of the group consisting of magnesium, iron, chromium, cobalt, nickel, copper, lead, aluminum, ruthenium, mercury and antimony.

7. A process for preparing a ceramic-metal intercalation compound having the formula:

$M_x[A]$ wherein A is a ceramic, M is a metal capable of incorporation into the crystal structure of the ceramic, said metal selected from the metals of Groups 1a, 1b, 2a, 2b, 3a, 3b, 4a, 4b, 5a, 5b, 6a, 6b, 7a, 7b, and 8 of The Periodic Table of the Elements, and x has a value in the range of about 0.002 to about 0.5, said ceramic-metal compound characterized as an intercalation compound, an inclusion compound, or a solid solution, said process comprising reacting at least one ceramic with at least one ionizable organometallic compound.

8. The process of claim 7 wherein said ceramic is reacted at a temperature of ambient or below in at least one inert, low dielectric solvent, said low dielectric solvent is selected from the group consisting of aldehydes, ethers, aliphatics, aromatics, and alkylhalides, and said metal (M) is a transition metal selected from the group consisting of the metals of Groups 1b, 2b, 3b, 4b, 5b, 6b, 7b, and 8 of The Periodic Table of the Elements.

9. The process of claim 7 wherein said ceramic is selected from the group consisting of at least one of borides, nitrides, carbides, silicides, phosphides, arsenides, and metal alloys thereof; said metal (M) is selected from the group consisting of magnesium, iron, chromium, cobalt, nickel, copper, lead, aluminum, ruthenium, mercury, and antimony; and said process is further characterized by reacting said ceramic (1) with said ionizable organometallic compound present in at least one inert, low dielectric solvent or (2) with a metal ion present in the gaseous phase.

10. The process of claim 9 wherein said carbides are reacted at a temperature of ambient or below and said carbides are selected from the group consisting of $B_4C$, TiC, SiC, and mixtures thereof.

11. The process of claim 9 wherein said borides are reacted at a temperature of ambient or below and said borides are selected from the group consisting of $TiB_2$, $ZrB_2$, $NbB_2$, and mixtures thereof.

12. The process of claim 9 wherein said nitrides are reacted at a temperature of ambient or below and said nitrides are selected from the group consisting of BN, AlN, $Si_3N_4$, and mixtures thereof.

13. The process of claim 9 wherein said low dielectric solvent is selected from the group consisting of $C_1$ to $C_8$ aldehydes $C_4$ to $C_8$ ethers, $C_4$ to $C_{12}$ aliphatics, $C_6$-$C_{20}$ aromatics, and $C_1$-$C_{20}$ alkyl halides.

14. The process of claim 13 wherein said ceramic is selected from the group consisting of silicon carbide, titanium diboride, zirconium diboride, niobium diboride, and boron carbide and said organometallic compound is selected from the group consisting of dicyclopentadienyl chromium, dicyclopentadienyl nickel, dicyclopentadienyl iron, di-butyl magnesium, dicyclopentadienyl cobalt, bis(triphenylphosphine) copper (I) borohydride, tetraphenyl lead, diphenyl mercury, bis(cyclopentadienyl) nickel, bis(cyclopentadienyl) chromium, dicyclopentadienyl ruthenium, trimethyl aluminum, triphenyl antimony, and mixtures thereof.

15. A densified ceramic-prepared article using a ceramic-metal intercalation compound having the formula $$M_x[A]$$

wherein A is a ceramic selected from the group consisting of at least one of nitrides, silicides, carbides, borides, phosphides, and arsenides, and metal alloys thereof and M is a metal capable of incorporation into the crystal structure of the ceramic, said metal (M) is selected from the metals of Groups 1a, 1b, 2a, 2b, 3a, 3b, 4a, 4b, 5a, 5b, 6a, 6b, 7a, 7b, and 8 of The Periodic Table of the Elements, and x has a value of about 0.002 to about 0.5.

16. The article of claim 15 characterized as having at least one of increased, density, hardness, and toughness wherein said metal (M) is a transition metal selected from the metals of Groups 1b, 2b, 3b, 4b, 5b, 6b, 7b, and 8 of The Periodic Table of the Elements.

17. The article of claim 15 wherein said ceramic is a carbide selected from the group consisting of $B_4C$, TiC, SiC, and mixtures thereof and said metal (M) is selected from the group consisting of at least one of magnesium, iron, chromium, cobalt, nickel, copper, lead, aluminum, ruthenium, mercury, and antimony.

18. The article of claim 15 wherein said ceramic is a boride selected from the group consisting of $TiB_2$, $ZrB_2$, $NbB_2$, and mixtures thereof and said metal (M) is selected from the group consisting of at least one of magnesium, iron, chromium, cobalt, nickel, copper, lead, aluminum, ruthenium, mercury, and antimony.

19. The article of claim 15 wherein said ceramic is a nitride selected from the group consisting of BN, AlN, $Si_3N_4$, and mixtures thereof and said metal (M) is selected from the group consisting of at least one of magnesium, iron, chromium, cobalt, nickel, copper, lead, aluminum, ruthenium, mercury, and antimony.

20. The article of claim 16 wherein said ceramic is selected from the group consisting of silicon carbide, titanium diboride, zirconium diboride, niobium diboride, and boron carbide and said metal is selected from the group consisting of at least one of cobalt, copper, mercury, nickel, chromium, ruthenium, and iron.

21. In a process for forming a ceramic article by densification of a ceramic-metal composition, said densification process comprising sintering, hot pressing, or hot isostatic pressing said ceramic-metal composition, the improvement comprising obtaining a densified article having at least one of increased density, hardness, and toughness by densifying a composition comprising a ceramic-metal intercalation compound having the formula $$M_x[A]$$

wherein A is a ceramic and M is a metal capable of incorporation into the crystal structure of the ceramic and x has a value of about 0.002 to about 0.5.

22. The process of claim 21 wherein said ceramic-metal article is formed from said ceramic-metal compound at a substantially reduced temperature and said ceramic (A) is selected from the group consisting of at least one of nitrides, silicides, carbides, borides, phosphides, and arsenides and metal alloys thereof and wherein said metal (M) is a metal selected from the metals of Groups 1b, 2b, 3b, 4b, 5a, 5b, 6a, 6b, 7a, 7b, and 8 of The Periodic Table of the Elements.

23. The process of claim 21 wherein said ceramic is a carbide selected from the group consisting of $B_4C$, TiC, SiC, and mixtures thereof and said metal (M) is selected from the group consisting of at least one of magnesium, iron, chromium, cobalt, nickel, copper, lead, aluminum, ruthenium, mercury, and antimony.

24. The process of claim 21 wherein said ceramic is a boride selected from the group consisting of $TiB_2$, $ZrB_2$, $NbB_2$, and mixtures thereof and said metal (M) is selected from the group consisting of at least one of magnesium, chromium, cobalt, nickel, copper, lead, aluminum, ruthenium, mercury, and antimony.

25. The process of claim 21 wherein said ceramic is a nitride selected from the group consisting of BN, AlN, $Si_3N_4$, and mixtures thereof and said metal (M) is selected from the group consisting of at least one of magnesium, iron, chromium, cobalt, nickel, copper, lead, aluminum, ruthenium, mercury, and antimony.

26. The process of claim 22 wherein said article is formed by hot pressing a ceramic-metal composition comprising a ceramic-metal compound formed by the reaction of a ceramic, selected from the group consisting of silicon carbide, titanium diboride, zirconium diboride, niobium diboride, and boron carbide, with an organometallic compound selected from the group consisting of dicyclopentadienyl chromium, dicyclopentadienyl nickel, dicyclopentadienyl iron, di-butyl magnesium, dicyclopentadienyl cobalt, bis(triphenylphosphine) copper (I) borohydride, tetraphenyl lead, diphenyl mercury, bis(cyclopentadienyl) nickel, bis(cyclopentadienyl) chromium, dicyclopentadienyl ruthenium, trimethyl aluminum, triphenyl antimony, and mixtures thereof.

* * * * *

UNITED STATES PATENT AND TRADEMARK OFFICE
CERTIFICATE OF CORRECTION

PATENT NO. : 5,021,368

DATED : June 4, 1991

INVENTOR(S) : Ronald J. Hoffman and Cindy S. Hart

It is certified that error appears in the above-identified patent and that said Letters Patent is hereby corrected as shown below:

Column 15, line 15, "A densified ceramic-prepared article using a ceramic-metal intercalation compound having the formula", should correctly read --A densified ceramic article prepared using a ceramic-metal intercalation compound having the formula--.

On the title page, Item [56] "References Cited, U.S. Patent Documents," line 7, "4,365,215" should correctly read --4,366,215--.

Signed and Sealed this

Twenty-seventh Day of April, 1993

*Attest:*

MICHAEL K. KIRK

*Attesting Officer*       *Acting Commissioner of Patents and Trademarks*